(12) United States Patent
Chow et al.

(10) Patent No.: US 8,364,032 B2
(45) Date of Patent: *Jan. 29, 2013

(54) LIGHT ISOLATING PROTECTIVE COVER FOR SMALL FORM FACTOR ELECTRONIC DEVICE

(75) Inventors: Chong Yip Chow, Fremont, CA (US); Hongqin Zhang, San Jose, CA (US); Shizhe Shen, San Jose, CA (US); Michael DiVincent, Discovery Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/401,575

(22) Filed: Feb. 21, 2012

(65) Prior Publication Data

US 2012/0148225 A1    Jun. 14, 2012

Related U.S. Application Data

(63) Continuation of application No. 12/904,862, filed on Oct. 14, 2010, now Pat. No. 8,155,514.

(60) Provisional application No. 61/385,494, filed on Sep. 22, 2010.

(51) Int. Cl.
    *G03B 15/03*      (2006.01)

(52) U.S. Cl. ......... 396/176; 396/535; 396/541; 150/154

(58) Field of Classification Search .................. 396/176, 396/535, 541; 359/511, 513, 514; 150/154
See application file for complete search history.

(56) References Cited

U.S. PATENT DOCUMENTS

| | | | | |
|---|---|---|---|---|
| 5,652,655 | A * | 7/1997 | Uno et al. ................. | 356/600 |
| 8,155,514 | B1 * | 4/2012 | Chow et al. ............... | 396/176 |
| 2005/0107118 | A1 | 5/2005 | Makino ..................... | 455/556.1 |
| 2005/0162543 | A1 | 7/2005 | Kobayashi ................. | 348/371 |
| 2006/0077649 | A1 * | 4/2006 | Kumagai .................... | 362/12 |
| 2008/0302456 | A1 * | 12/2008 | Cook ......................... | 150/154 |
| 2008/0316687 | A1 * | 12/2008 | Richardson et al. ....... | 361/680 |
| 2009/0080153 | A1 * | 3/2009 | Richardson et al. ....... | 361/679.56 |
| 2009/0161215 | A1 | 6/2009 | Chan ......................... | 359/511 |

FOREIGN PATENT DOCUMENTS

| | | |
|---|---|---|
| EP | 1 211 869 A1 | 6/2002 |
| JP | 2005275074 | 10/2005 |
| WO | WO 2005/104506 | 11/2005 |

OTHER PUBLICATIONS

"Front and Back Screen Protector for iPhone 4," http://www.cellphoneshop.net/iphone4scr.html.
Apple Store, "iSkin solo FX Special Edition Case for iPhone 3GS," http://store.apple.com/us/product/TX759ZM/B?fnode=MTY1NDA0NA&mco=MTM3NzIzMTM.
Written Opinion of the International Searching Authority for PCT Application No. PCT/US2011/047267 dated Nov. 9, 2011.
International Search Report for PCT Application No. PCT/US2011/047267 dated Nov. 9, 2011.

* cited by examiner

*Primary Examiner* — Clayton E Laballe
*Assistant Examiner* — Warren K Fenwick
(74) *Attorney, Agent, or Firm* — Womble Carlyle Sandridge & Rice LLP

(57) ABSTRACT

A portable device has a rear facing camera assembly and a front facing display assembly that includes at least a protective cover layer, a display stack that includes a plurality of display components arranged in a plurality of interconnected layers, the display stack providing an imaging service, and a flat support chassis arranged to provide support for the display stack. In the described embodiment, a protective cover can wrap around and protect at least the rear portion of the portable device without adversely affecting an image capture process carried out by the rear facing camera assembly.

8 Claims, 15 Drawing Sheets

LIGHT ISOLATING PROTECTIVE COVER FOR SMALL FORM FACTOR ELECTRONIC DEVICE

CROSS-REFERENCE TO RELATED APPLICATIONS

This application is a continuation of U.S. patent application Ser. No. 12/904,862, filed Oct. 14, 2010, which claims priority to U.S. Provisional Patent Application No. 61/385,494, filed Sep. 22, 2010, entitled "LIGHT ISOLATING PROTECTIVE COVER FOR SMALL FORM FACTOR ELECTRONIC DEVICE HAVING CAMERA AND FLASH ASSEMBLY" by Chow et al. both of which are incorporated by reference in their entirety.

TECHNICAL FIELD

The described embodiments relate generally to small form factor electronic devices. More particularly, providing a protective cover for a small form factor electronic device having a rear facing camera assembly, the protective cover prevents light bleed from the light source interfering with the image capture by the rear facing camera assembly.

DESCRIPTION OF THE RELATED ART

Small form factor electronic devices such as the iPhone™ manufactured by Apple Inc. of Cupertino, Calif. have become imbued with many functions other than those related to voice communication. These "smartphones" can include image capture devices such as a still or video camera that can be used to capture images that can be used to provide a single snapshot or be processed into a video. However, in order protect the exterior of the small form factor electronic device, a plethora of protective covers have been deployed on the market. The protective covers are typically formed of a plastic material and are designed in such a way to essentially encapsulate at least a rear portion of the small form factor electronic device leaving a front portion exposed in order to accommodate a front facing display device.

In order to accommodate a rear facing camera assembly, the typical cover provides a suitably sized and shaped opening in the protective cover. However, when the light source (usually a form of flash or strobe) is used to illuminate a subject, some of the light emitted by the light source can be reflected into the area between an inside surface of the cover and an exterior surface of the small form factor electronic device. At least some of this reflected light can make its way to the lens portion of the camera assembly where it can be added to the light received from the illuminated subject having the potential to adversely affect the quality of the captured image. For example, when the cover is formed of a material that can absorb and reflect light (such as plastic), the color of the reflected light can be shifted towards the color of the cover. In this way, the substantially white light provided by the light source can be color shifted to the color of the cover causing serious color contamination of the captured image, which may or may not be correctable.

Therefore, a protective cover for a small form factor electronic device having a rear facing camera assembly that does not adversely affect the quality of the images captured is desired.

SUMMARY OF THE DESCRIBED EMBODIMENTS

A protective cover for a small form factor electronic is described. The small form factor electronic device has at least a rear facing camera assembly, the camera assembly having a lens assembly and a light source in close proximity to the lens assembly, the light source arranged to emit light used to illuminate a subject, the lens assembly arranged to capture at least some of the light reflected from the subject wherein a portion of the light reflected from the subject is provided by the light source. Accordingly, the protective cover includes at least a housing having a shape in accordance with the small form factor electronic device, the shape being suitable for enclosing at least some of the rear portion of the small form factor electronic device. The housing, in turn, includes at least an opening suitably sized and positioned relative to the camera assembly that allows light from the light source to illuminate the subject. At least some of the light emitted by the light source is then reflected back to the lens assembly for image capture. The protective cover also includes at least a light blocking mechanism that prevents light emitted by the light source and reflected by anything other than the subject being illuminated from reaching the lens assembly.

A method for forming a protective cover for protecting a small form factor electronic device is described. The small form factor electronic device having at least a rear facing camera assembly, the camera assembly having a lens assembly and a light source in close proximity to the lens assembly. The method can be carried out by receiving a housing shaped in accordance with the small form factor electronic device, providing an opening in the housing, the opening suitably sized and positioned relative to the camera assembly such that when the protective cover is appropriately placed on the small form factor electronic device, the opening allows light from the light source to illuminate an object in such a way that at least some of the light from the light source is reflected back and captured by the lens assembly for image capture, and providing a light blocking mechanism that prevents light emitted by the light source and reflected by anything other than the object being illuminated from reaching the lens assembly.

In yet another embodiment, a system is described. The system includes at least a small form factor electronic device having at least a rear facing camera assembly, the camera assembly having a lens assembly and a light source in close proximity to the lens assembly, the light source arranged to emit light used to illuminate a subject, the lens assembly arranged to capture at least some of the light reflected from the subject wherein a portion of the light reflected from the subject is provided by the light source and a protective cover attached to the small form factor electronic device. In the described embodiment, the protective cover includes at least a housing, the housing having a shape in accordance with the small form factor electronic device, the shape being suitable for enclosing at least some of the rear portion of the small form factor electronic device. The housing includes an opening suitably sized and positioned relative to the camera assembly that allows light from the light source to illuminate the subject that is then reflected back to the lens assembly for image capture, and a light blocking mechanism that prevents light emitted by the light source and reflected by anything other than the subject being illuminated from reaching the lens assembly.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

DETAILED DESCRIPTION OF REPRESENTATIVE EMBODIMENTS

Figure 1:
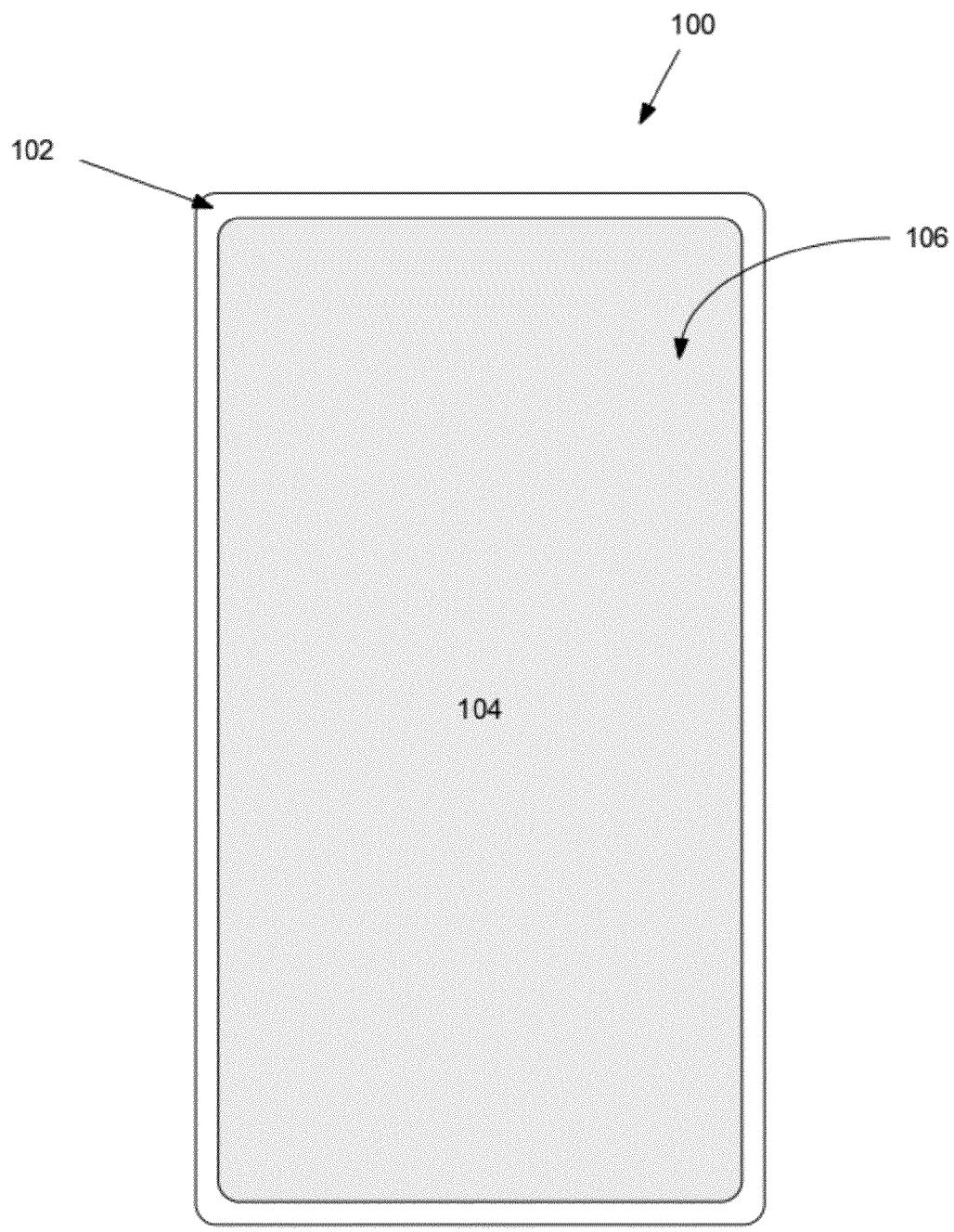
FIGS. 1 and 2 show a representative small form factor electronic device in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Aspects of the described embodiments relate to a small form factor electronic product. For the remainder of this discussion, the small form factor electronic device will be described in terms of a personal media device. The personal media device can include a housing suitable for enclosing and supporting various operational components. The housing can support various input/output mechanisms such as volume switches, power buttons, data and power connectors, audio jacks and the like. The housing can include openings to accommodate the input/output mechanisms. The locations at which the input/output mechanisms are placed can be selected to enhance the usability of the interface under conditions for which the device is intended to operate. For instance, for a device intended to be operated with a single hand, the input mechanisms, such as an audio control switch, can be placed at a location that are easily finger operated while the device is held in the palm of the hand. Other output mechanisms, such as an audio jack, can be placed at locations that do not interfere with holding the device, such as on a top edge of the device.

The personal media device can include a front facing display and a rear facing camera assembly that can include at least a flash and a lens assembly in close proximity to the light source. In this way, a maximal amount of light generated by the light source can be transmitted to and subsequently be reflected from an object. The reflected light from the object can be captured by lens assembly for image processing by image processing circuitry in the personal media device. In some cases, the front facing display can be used as a view finder in that an image of the object can be presented in real time at the front facing display. In this way, an approximation of the composition of the captured imaged can be used to decide whether or not to initiate the image capture process. The image capture process can include initiating a flash sequence in those situations where additional light over and above ambient light may be needed.

A protective cover can be provided to protect the personal media device. In particular the protective cover can have a wrap around design in which the protective cover at least partially wraps around and encloses the personal media device. In any case, regardless of the amount of wrap around, the protective cover substantially covers a rear portion of the personal media device. In order not to impede the image capture process while still allowing the cover to enclose the personal media device, various configurations of the cover can be provided that allow light from the light source to illuminate the object that is a subject of an image capture event.

In contrast on conventional cover accessories, the protective cover and assorted accessories described herein substantially eliminate the possibility that any light emitted by the light source and reflected/transmitted in the region between the cover or accessory and the housing of the personal media device will affect the image capture process by, for example, adding color shifted light to that light received by a lens assembly. In one embodiment, in order to prevent the addition of reflected back light to the light captured by the lens assembly, at least a portion of the camera assembly is protected at least in part by a light barrier, or light dam. In this way, the light barrier can absorb any back reflected light in the vicinity of the camera assembly, and more importantly, the lens assembly. The light barrier can be configured to protect an entire camera assembly (i.e. both the lens assembly and the associated light source, such as a flash). In some embodiments, the light barrier can be arranged to protect a portion of the camera assembly. For example, the light barrier can protect only the lens assembly by essentially surrounding only the lens assembly and thereby optically isolating the lens assembly from light contamination such as the back reflected light. In other arrangements, the light source can be substantially surrounded by the light barrier in such a way that little or no light emitted by the light source finds its way into the back reflecting region. In this way, by surrounding the light source, any back reflected light is essentially eliminated obviating the need to protect the lens assembly.

In still another embodiment, a reflective layer can be added to the light barrier in the region nearest the light source. In this way, the absorption of light emitted by the light source meant to illuminate the object whose image is being captured can be minimized if not essentially eliminated. In this way, the amount of light used to illuminate the subject is remains substantially unchanged over the amount of light emitted by the light source. An added convenience to the use of reflective layers is that the amount of light reaching the object can be maximized since the light emitted by the light source can be directed in a more collimated manner thereby increasing an overall amount of light actually illuminating the object.

The shape of the light barrier can take many forms. In some embodiments, the shape of the light barrier can be rectangular (i.e., in the shape of a geometric shape such as a square, rectangle, triangle, parallelogram, and so forth). In other embodiments, the opening can have a curvilinear shape such as a circle, ellipse or any combination thereof. In some embodiments, a reflective layer can be provided. The reflective layer acting to maximize an amount of light emitted by the light source that illuminates the object. In this way, the amount of back reflected light can be reduced while optimizing an amount of light that can be used to illuminate the object. In this way, the quality of the captured image (i.e., color accuracy, shading, etc.) can be greatly improved over conventional protective covers.

These and other embodiments are discussed below with reference to FIGS. 1-15. However, those skilled in the art will readily appreciate that the detailed description given herein with respect to these figures is for explanatory purposes only and should not be construed as limiting.

FIG. 1 and are perspective diagrams showing various views of fully assembled personal media device 100 in accordance with an embodiment of the invention. In particular, FIG. 1 shows a front portion of personal media device 100. Personal media device 100 can be sized for one-handed operation and placement into small areas such as a pocket, i.e., personal media device 100 can be a handheld pocket sized electronic device. By way of example, personal media device 100 can correspond to a computer, media device, telecommunication device and/or the like. Personal media device 100 is capable of processing data and more particularly media such as audio. Personal media device 100 can generally correspond to a music player, game player, video player, personal digital assistant (PDA), and/or the like. With regards to being handheld, personal media device 100 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

Personal media device 100 can be widely varied. In some embodiments, personal media device 100 can perform a single function (e.g., a device dedicated to playing and storing media) and, in other cases, the personal media device can perform multiple functions (e.g., a device that plays/stores media, receives/transmits telephone calls/text messages/internet, and/or performs web browsing). Personal media device 100 is capable of communicating wirelessly (with or without the aid of a wireless enabling accessory system) and/or via wired pathways (e.g., using traditional electrical wires). In some embodiments, personal media device 100 can be extremely portable (e.g., small form factor, thin, low profile, lightweight). Personal media device 100 can even be sized for one-handed operation and placement into small areas such as a pocket, i.e., personal media device 100 can be a handheld pocket sized electronic device. Personal media device 100 can correspond to any of those electronic devices an iPod™, or an iPhone™ available by Apple Inc. of Cupertino, Calif.

Personal media device 100 can include housing 102 configured to at least partially enclose any suitable number of components associated with personal media device 100. For example, housing 102 can enclose and support internally various electrical components (including integrated circuit chips and other circuitry) to provide computing operations for the device. The integrated circuit chips and other circuitry can include a microprocessor, memory, a battery, a circuit board, I/O, various input/output (I/O) support circuitry and the like. Although not shown in this figure, housing 102 can define a cavity within which the components can be positioned and housing 102 also can physically support any suitable number of mechanisms, within housing 102 or within openings through the surface of housing 102.

In addition to the above, housing 102 can also define at least in part the outward appearance of personal media device 100. That is, the shape and form of housing 102 can help define the overall shape and form of personal media device 100 or the contour of housing 102 can embody the outward physical appearance of personal media device 100. Any suitable shape can be used. In some embodiments, the size and shape of housing 102 can be dimensioned to fit comfortably within a user's hand. In some embodiments, the shape includes a slightly curved back surface and highly curved side surfaces. Housing 102 is integrally formed in such as way as to constitute is a single complete unit. By being integrally formed, housing 102 has a seamless appearance unlike conventional housings that include two parts that are fastened together thereby forming a reveal, a seam there between. That is, unlike conventional housings, housing 102 does not include any breaks thereby making it stronger and more aesthetically pleasing. Housing 102 can be formed of any number of materials including for example plastics, metals, ceramics and the like. In one embodiment, housing 102 can be formed of stainless steel in order to provide an aesthetic and appealing look and feel as well as provide structural integrity and support for all sub-assemblies installed therein. When metal, housing 102 can be formed using conventional collapsible core metal forming techniques well known to those skilled in the art.

Personal media device 100 also includes display 104 that can be assembled and contained within housing 102. Such user input events can be used for any number of purposes, such as resetting personal media device 100, selecting between display screens presented on display assembly 104, and so on. In one embodiment, cover layer 106 can be a protective top layer of transparent or semitransparent material (clear) such that display assembly 104 is visible therethrough. That is, cover layer 106 serves as a window for display assembly 104 (i.e., the transparent cover overlays the display screen). In one particular embodiment, cover layer 106 is formed from glass (e.g., cover glass), and more particularly highly polished glass. It should be appreciated, however, that other transparent materials such as clear plastic can be used.

The viewing region can be touch sensitive for receiving one or more touch inputs that help control various aspects of what is being displayed on the display screen. In some cases, the one or more inputs can be simultaneously received (e.g., multi-touch). In these embodiments, a touch sensing layer (not shown) can be located below the cover glass 106. The touch sensing layer can for example be disposed between the cover glass 106 and the display assembly 104. In some cases, the touch sensing layer is applied to display assembly 104 while in other cases the touch sensing layer is applied to the cover layer 106. The touch sensing layer can for example be attached to the inner surface of the cover glass 106 (printed, deposited, laminated or otherwise bonded thereto). The touch sensing layer generally includes a plurality of sensors that are configured to activate as the finger touches the upper surface of the cover layer 106. In the simplest case, an electrical signal is produced each time the finger passes a sensor. The number of signals in a given time frame can indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, and speed and acceleration information. This information can then be used by the personal media device 100 to perform the desired control function relative to display assembly 104.

Figure 2:
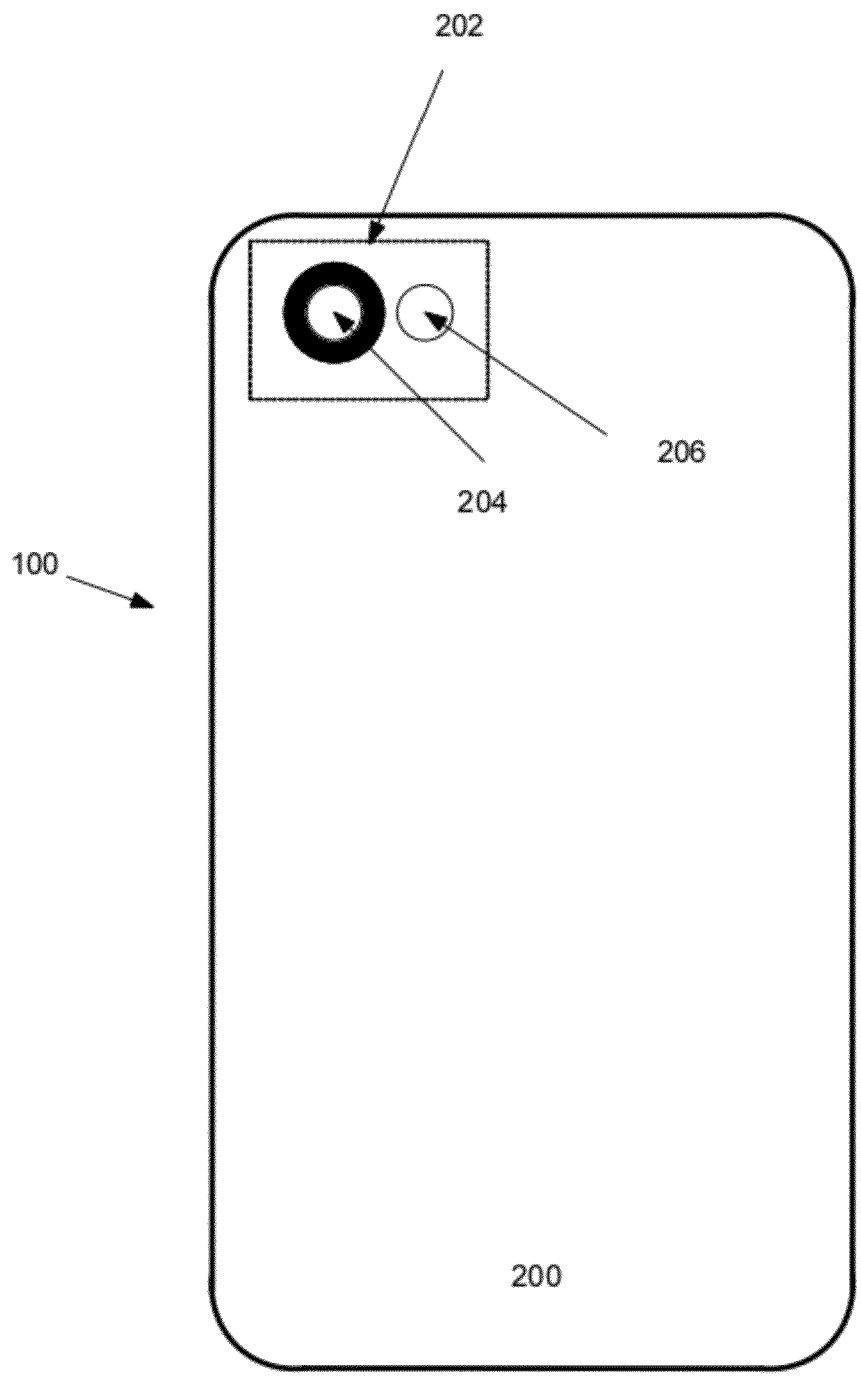
Figure 3:
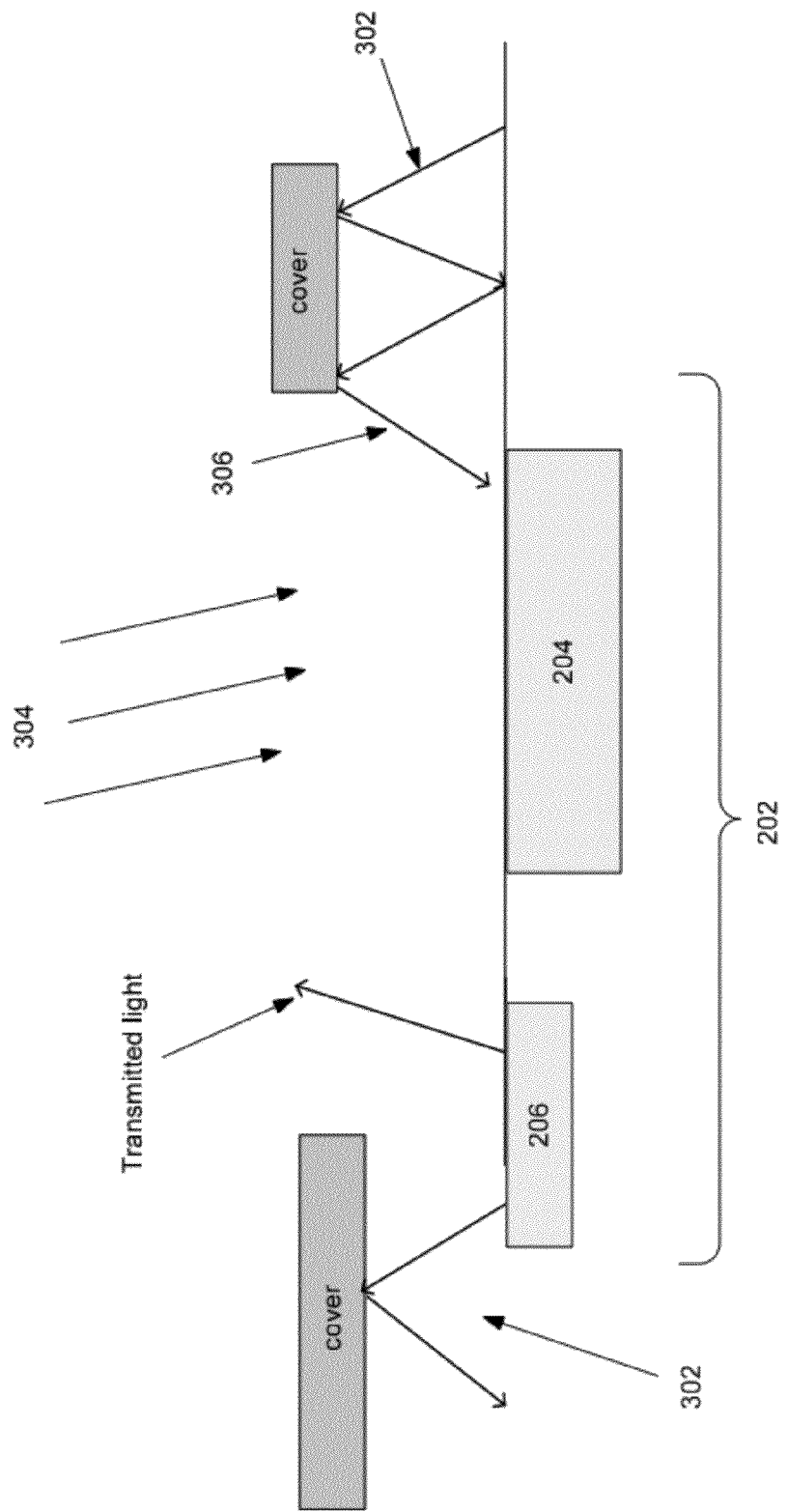
FIGS. 3-9 show various embodiments of a protective cover.

FIG. 2 shows rear portion 200 of personal media device 100 in accordance with the described embodiments. Located on rear portion 200 can be found camera assembly 202. Lens unit 204 of camera assembly 202 can be used to capture light reflected from an object. The captured light can then be processed by image processing circuitry in or at least associated with personal media device 100 to form a captured image, or simply image. The image can be further processed to form a single image, such as a snapshot, or as part of a video in the form of a video frame.

In those situations where ambient light levels is not sufficient (or simply more light is desired), light source 206 can act as a light source arranged to generate light that can be used to augment ambient light. In some cases, light source 206 can take the form of a flash that can produce a large amount of light for a short period of time. As a flash, light source 206 is well suited to augment ambient light for single images. In some embodiments, light source 206 can take the form of a lamp configured to produce light for a longer duration than the light source configuration. In this way, light source 206 configured as the lamp can be well suited for applications such as video generation where a source of sustained light is preferred.

Since light from light source 206 spreads out in more or less a spherical manner, some of the light from light source 206 can be back reflected from an inner surface of a conventional cover unit and back reflected from an exterior surface of housing 102. The process of back reflection can be exacerbated in those situations where housing 102 is formed of a highly polished material, such as plastic or glass that reflects a substantial portion of incident light. In this way, at least some amount of back reflected light 302 can reach lens unit 204 at least some of which can be added to light 304 reflected from the object as light contamination 306. Light contamination 306 can adversely affect the image capture process by adding color elements corresponding to the color of the conventional protective cover unit as well as changing overall white level and reducing contrast.

In order to prevent light contamination 306 from adversely affecting the image capture process of personal media device 100, various embodiments of protective covers can be implemented as shown in the following figures.

Figure 4:
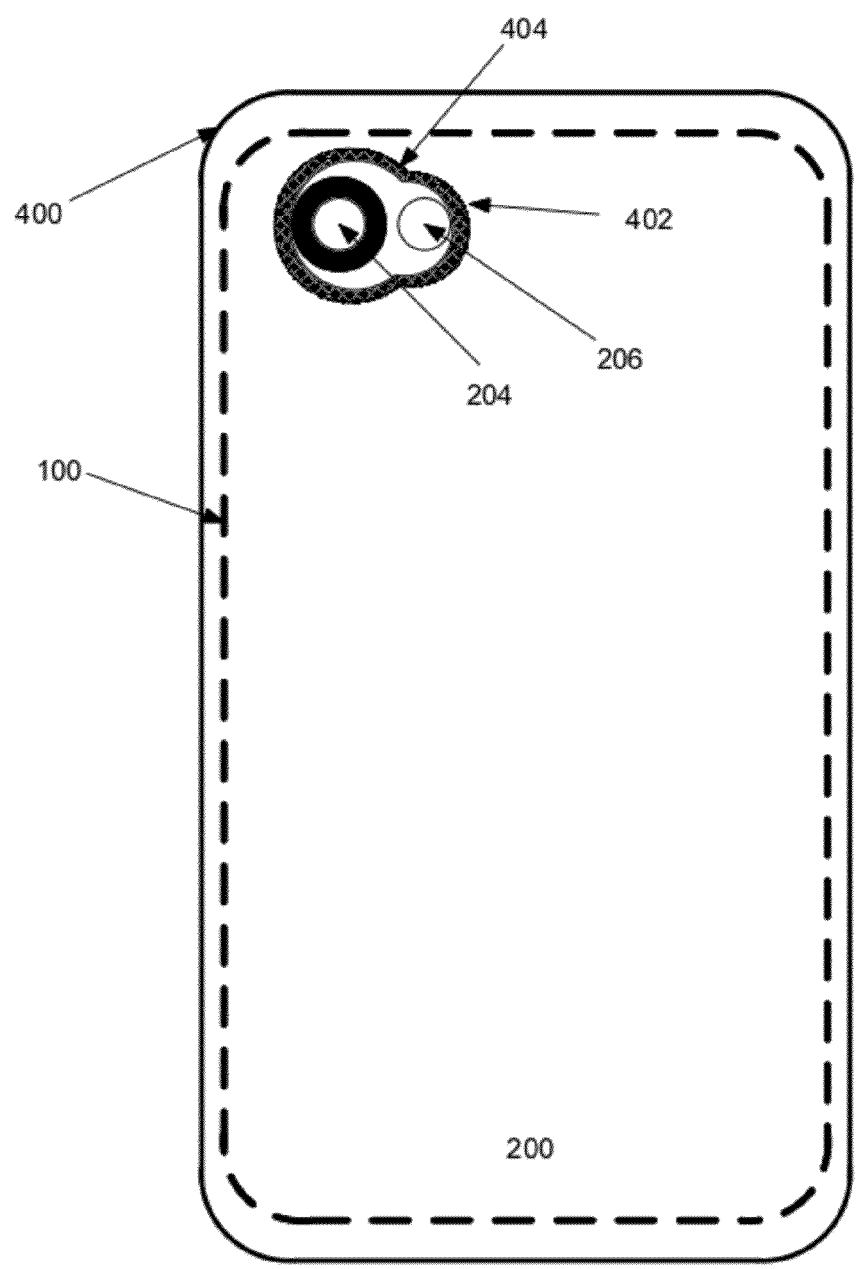

As shown in FIG. 4, protective cover 400 can wrap around and enclose at least a portion of device 100. For the remainder of this discussion, it is presumed that in all embodiments, at least some of display 104 remains viewable. Therefore, the various embodiments of protective covers described herein are presumed to enclose at least most of rear portion 200 of personal media device 100 and leave at least some of display 104 viewable. In this way, as shown in FIG. 4, protective cover 400 can include opening 402 having a size in accordance with at least camera assembly 202. Opening 402 can be positioned in such a way as to not affect the ability of camera assembly 202 to function properly. In this regard, opening 402 can have a shape that is widely varied as will be presented below. For example, opening 402 in FIG. 4 can have a curvilinear shape along the lines of a circle, ellipse, or any combination thereof. Opening 402 can also have shape that although is somewhat curved in nature, does not describe a regular conic section (circle, ellipse) but can be more along the lines of an irregular closed area having an overall curvilinear shape. In order to prevent the back reflection of light emitted by light source 206, light dam (or block) 404 can be provided. Light block 404 can be part of cover 400 and in particular forms a close region surrounding opening 402. By closed region it is meant that light dam 404 is configured to block (or absorb) any incident light at least some of which is generated by light source 206. Light block 404 can be formed of any number and type of suitable material having the appropriate light blocking properties.

Figure 5:
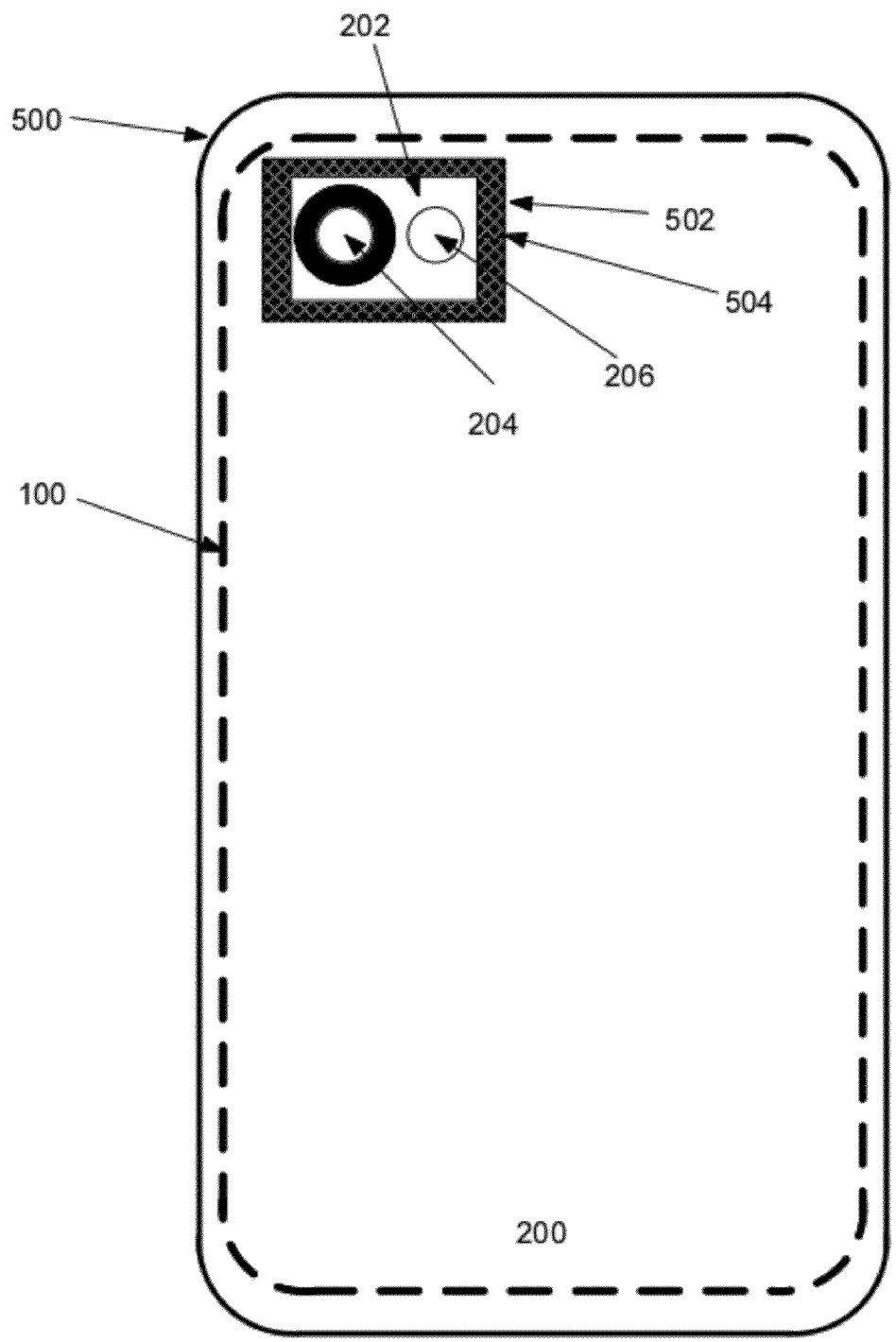

FIG. 5 shows another embodiment of cover 500 having rectangular shaped opening 502 with associated light dam 504.

Figure 6:
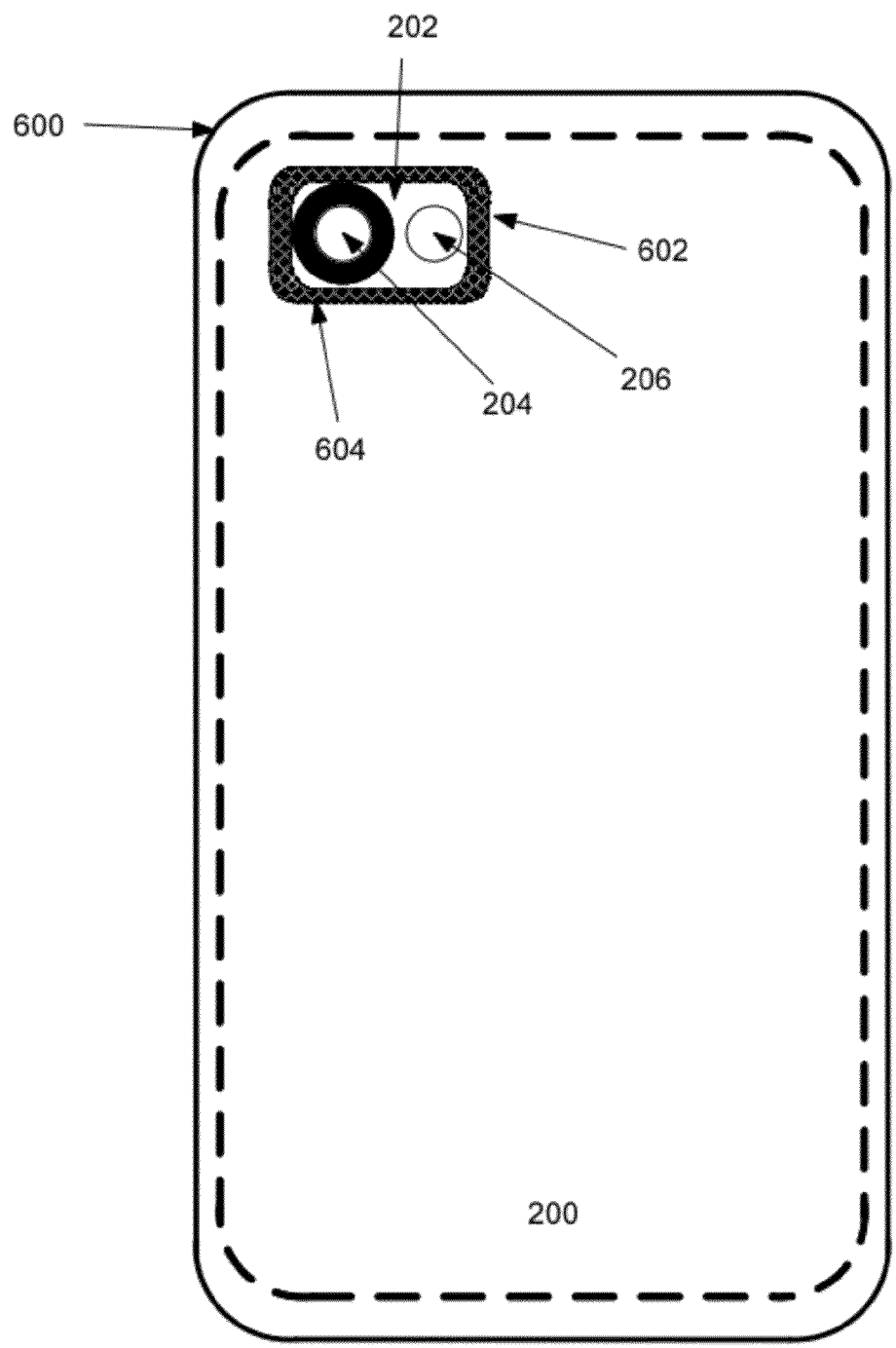

FIG. 6 shows yet another embodiment of cover 600 having opening 602 with both curvilinear and rectangular elements with associated light dam 604.

Figure 7:
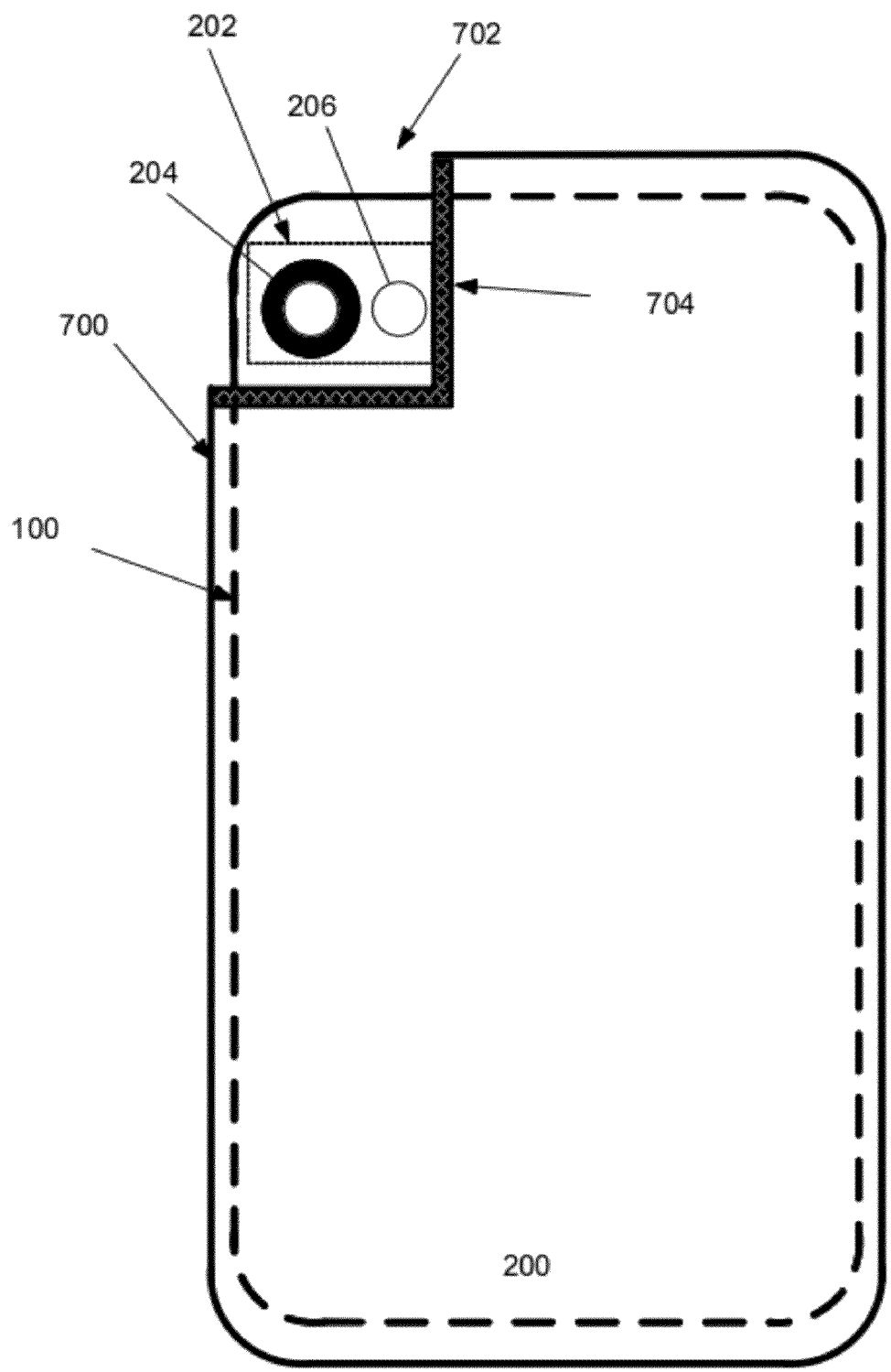

In another embodiment, as shown in FIG. 7, cover 700 can be used in which corner potion 702 has been removed to expose camera assembly 202. In this embodiment, light dam 704 can be used to optically isolate camera assembly 202 from the area between cover 700 and housing 102.

Figure 8:
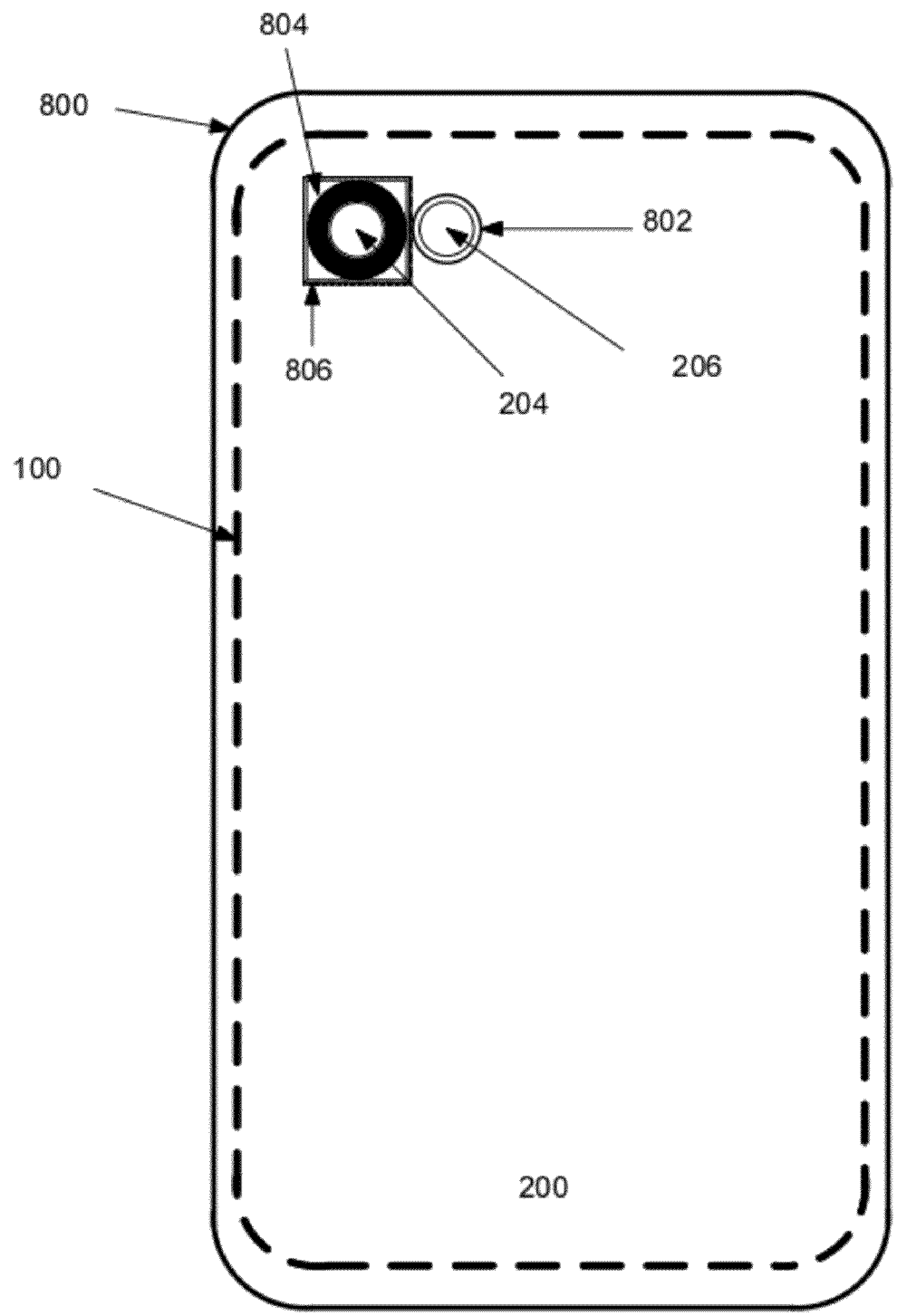

In some embodiments as shown in FIG. 8, cover 800 can include opening 802 for light source 206 having now light block and opening 804 having light block 806. In this way, light block 806 optically isolates lens unit 204 from any back reflected light from light source 206. In this way, an amount of light from light source 206 blocked by light block 806 can be reduced while still protecting lens unit 206 from light contamination 306.

Figure 9:
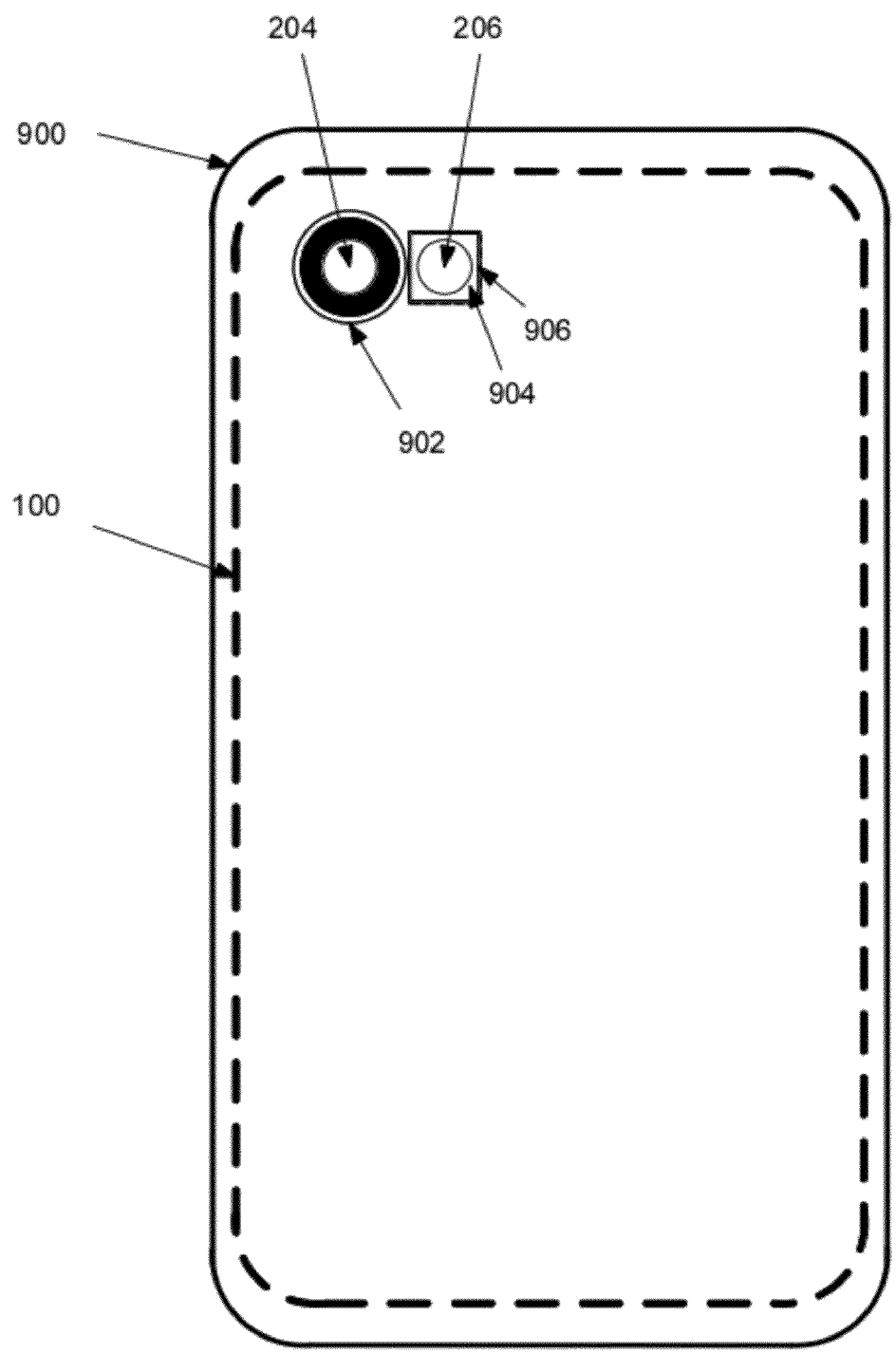

On the other hand, FIG. 9 shows yet another embodiment of cover 900 having opening 902 with not light block associated with lens unit 204 and opening 904 with light block 906 associated with light source 206.

Figure 10:
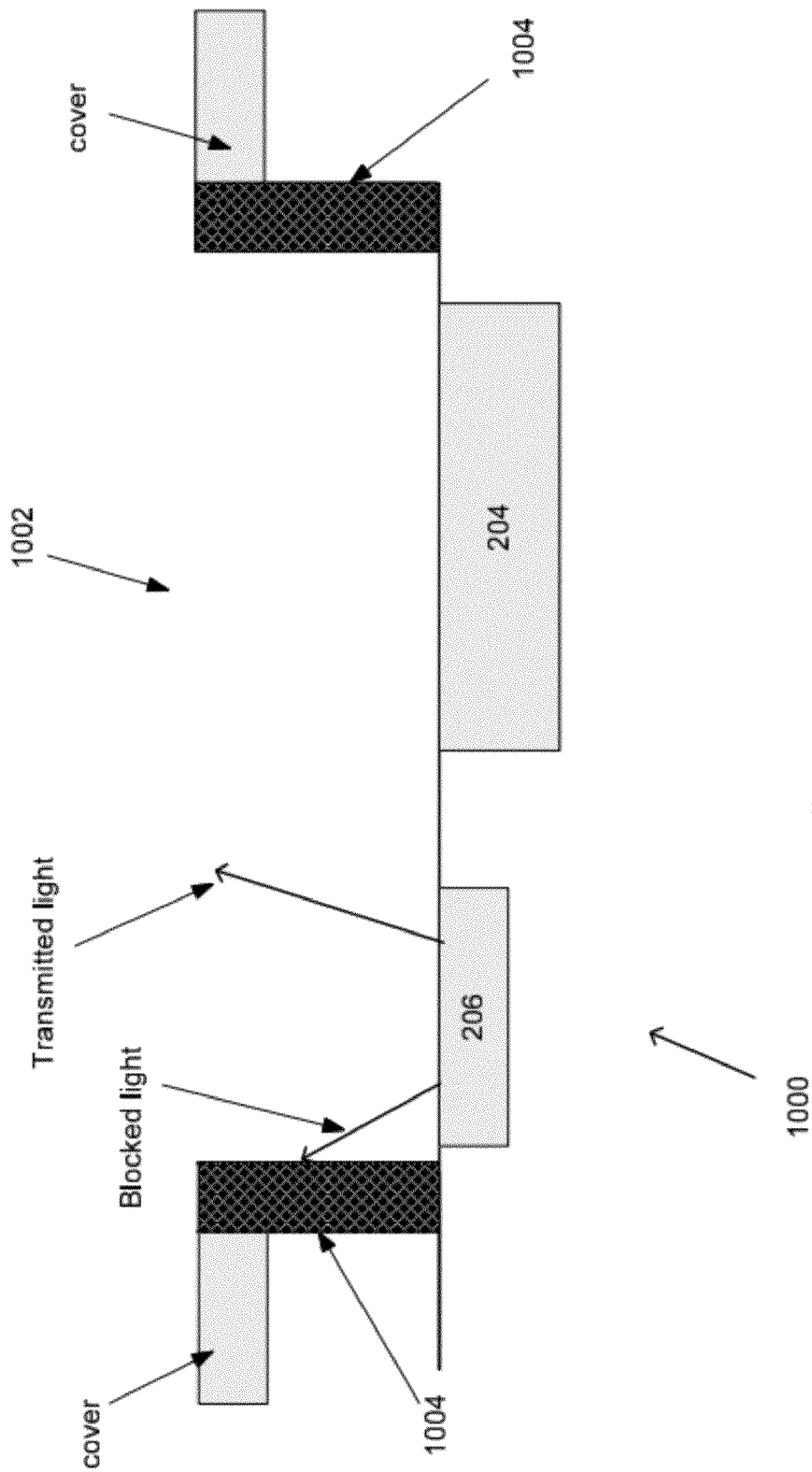
FIGS. 10-14 show representative cross sections of a protective cover in accordance with the described embodiments.

FIG. 10 shows representative cross section 1000 of single opening 1002 along the lines shown in FIGS. 4-6 illustrating the manner in which at least some of light from light source 206 can be prevented from back reflecting in the region between cover 400 and housing 102 by the intercession of light block 1004. It should be noted that FIG. 10 shows only the cross sectional view and in reality, light block 1004 conforms with the perimeter of opening 1002 in order to prevent as much light from leaking to lens unit 204.

Figure 11:
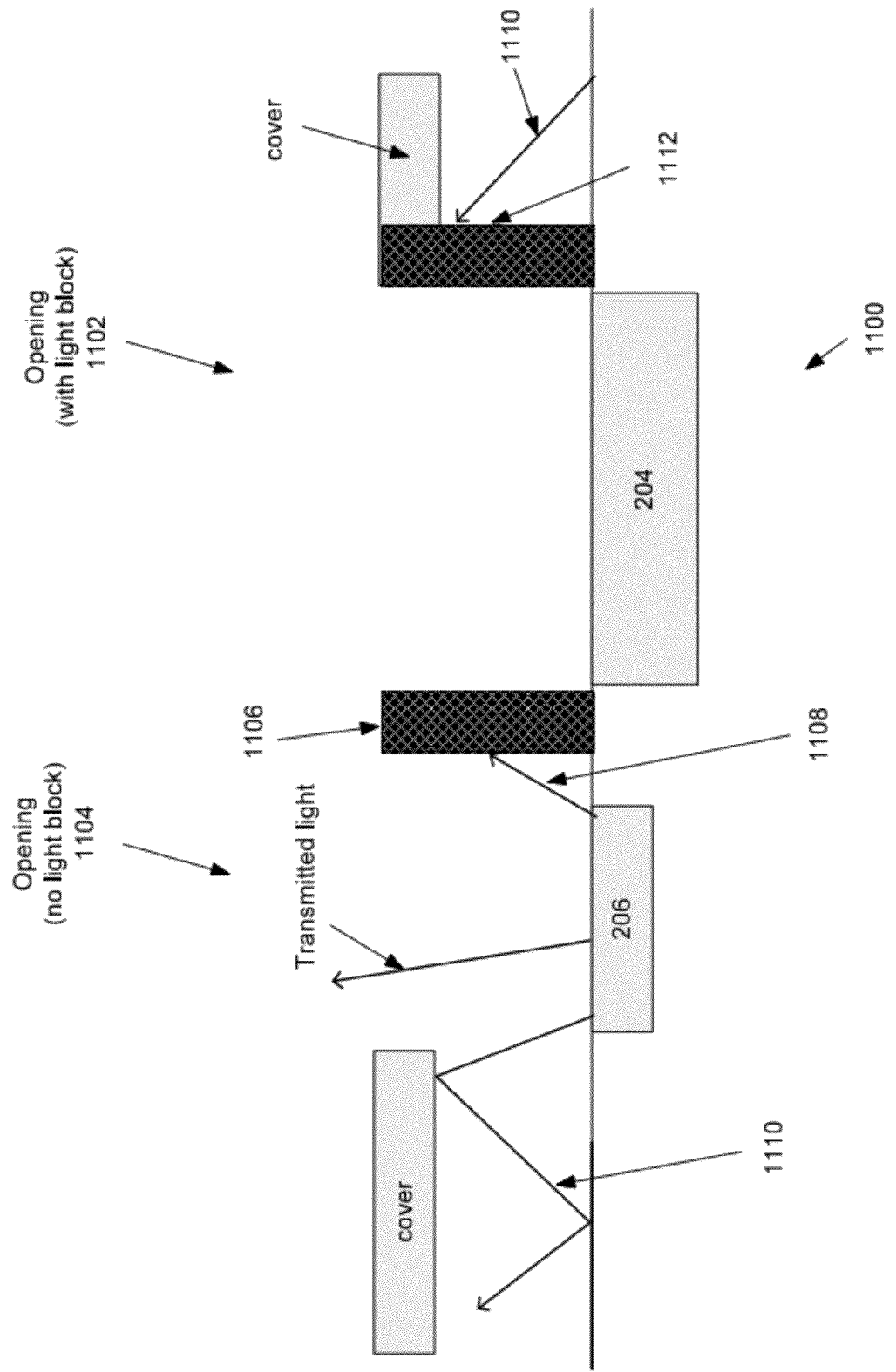

FIG. 11 shows a representative cross section 1100 of a multiple opening arrangement of cover 400 with opening 1102 with no separate light block associated opening 1104 having associated light block 1106. As can be seen, light 1108 from light source 206 impinging on light block 1106 can be blocked directly whereas back reflected light 1110 can be blocked by light block 1112. In this way, lens unit 206 is protected from the effects of any light contamination caused by back reflected light from light source 206.

Figure 12:
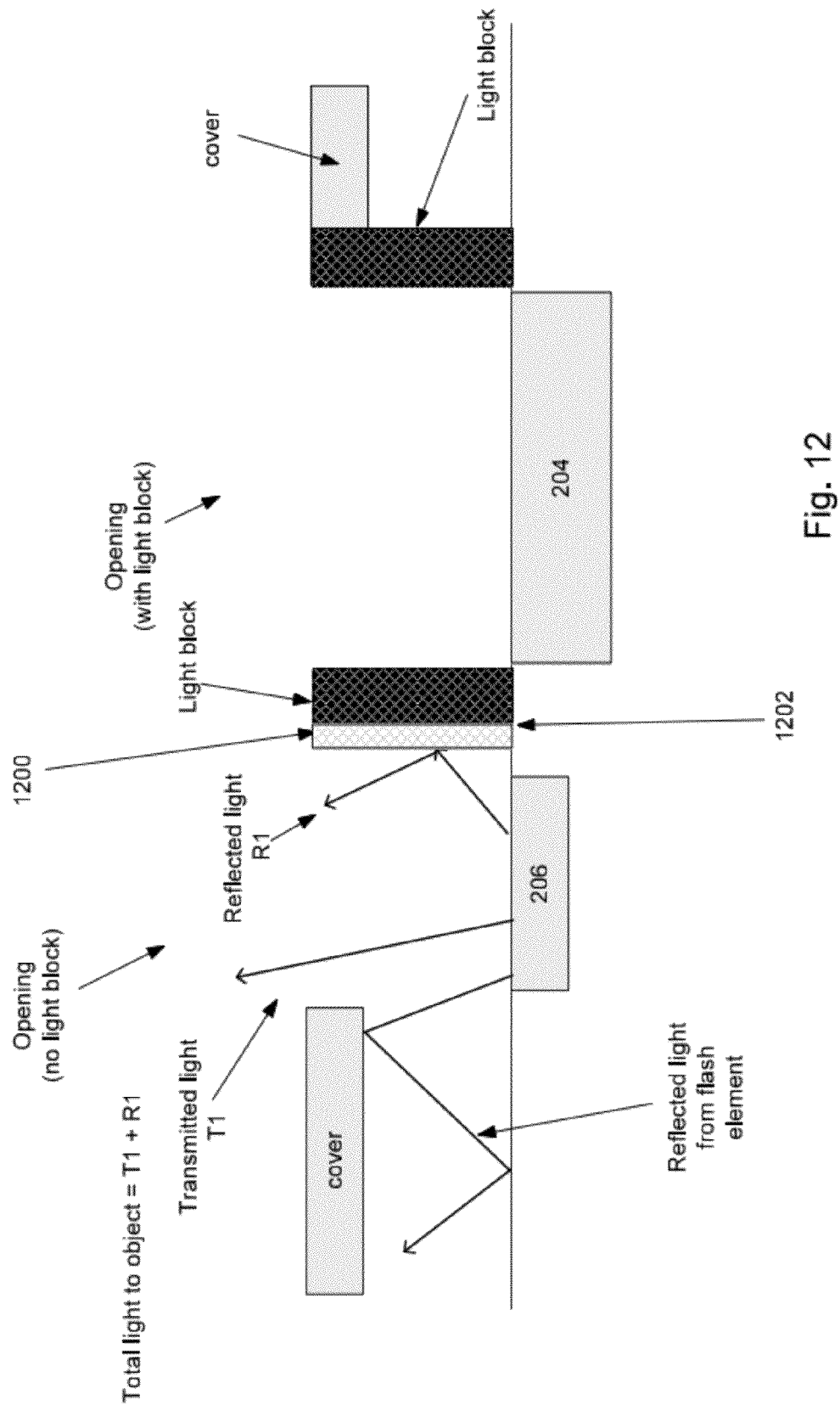
Figure 13:
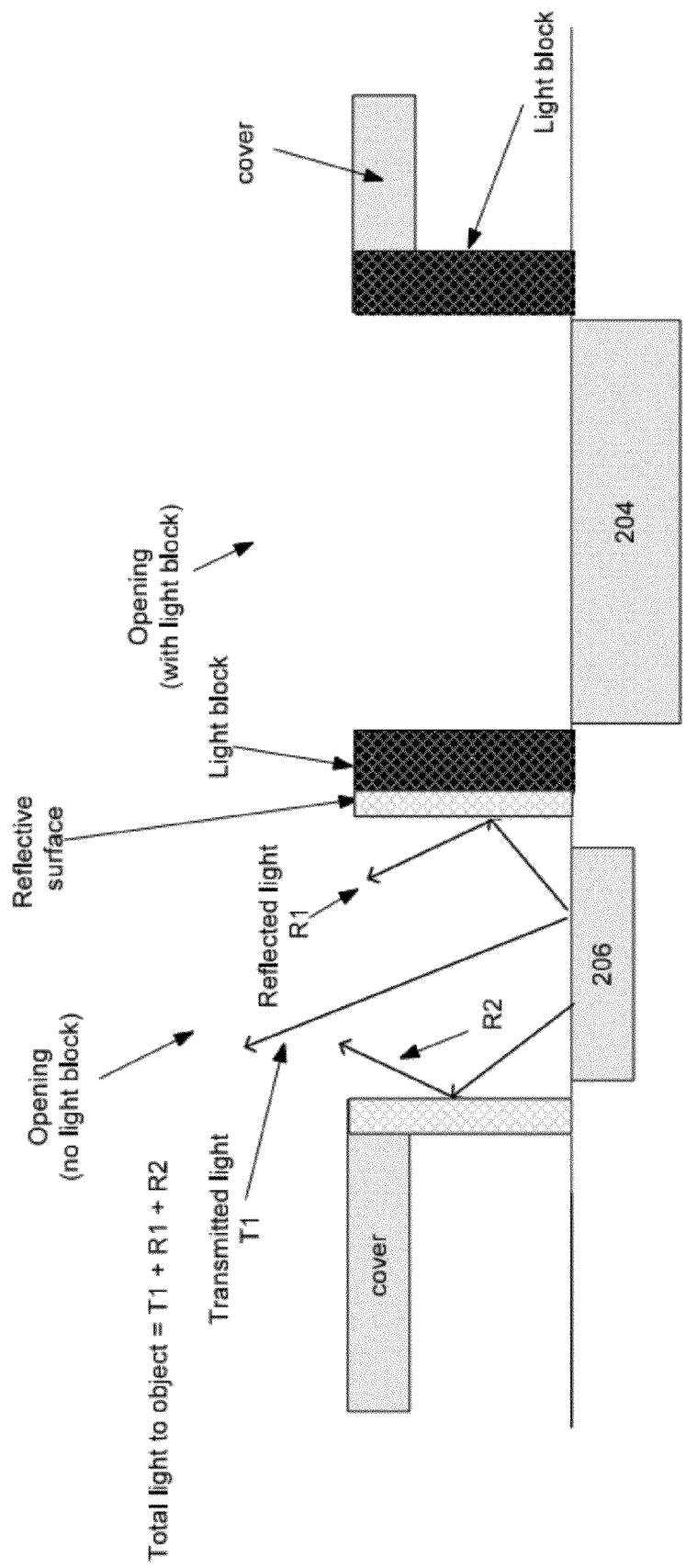
Figure 14:
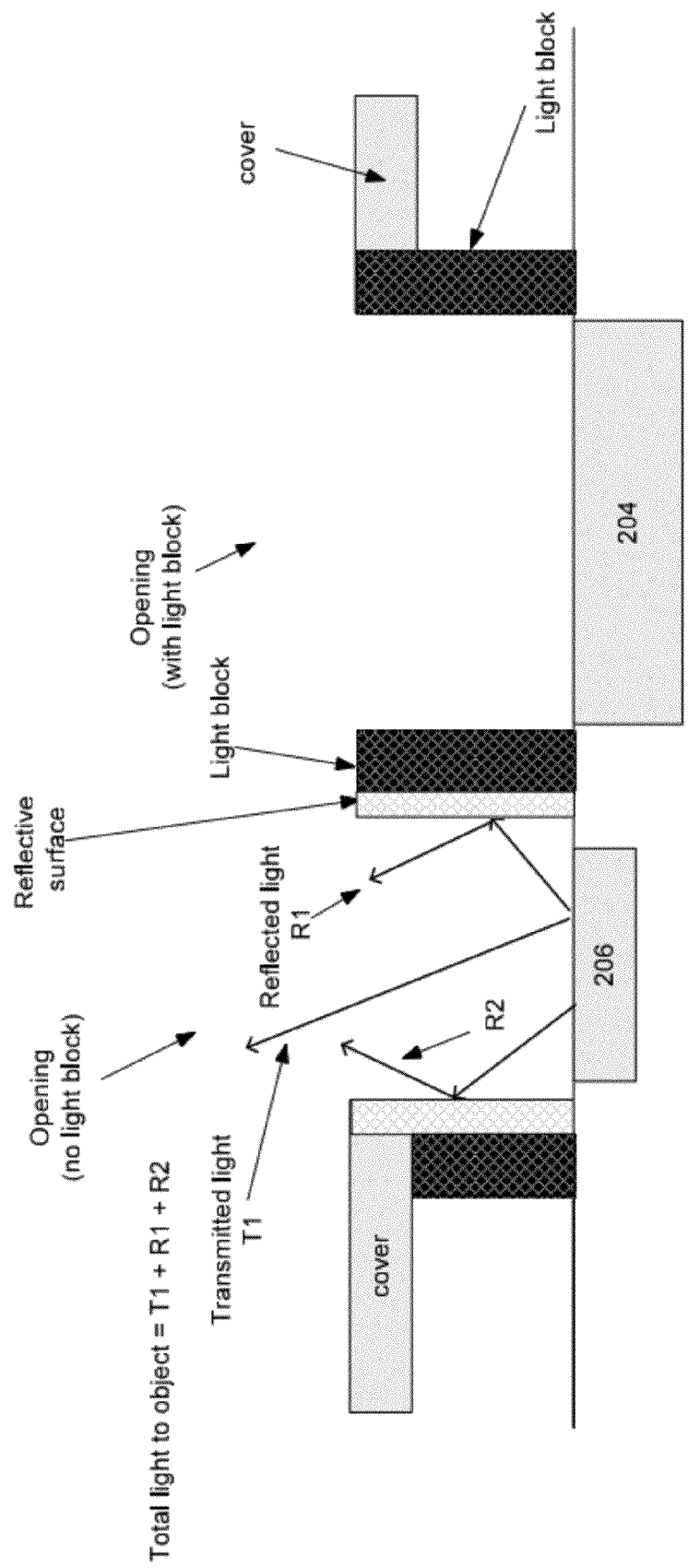

In some embodiments such as shown in FIG. 12, reflective layer 1200 can be added to at least a portion of exterior surface 1202 of light block. In this way, an amount of reflected light R1 can be re-directed to the object being illuminated by light T1 from light source 206. In this way, the total amount of light available for illumination of the object can be about the sum of R1 and T1. Second reflective layer 1204 can be added in order to increase reflected light even further as shown in FIGS. 13 and 14. Second reflective layer 1204 can add reflected light R2 to both incident light T1 and first reflected light R1 to further illuminate the object being illuminated.

Figure 15:
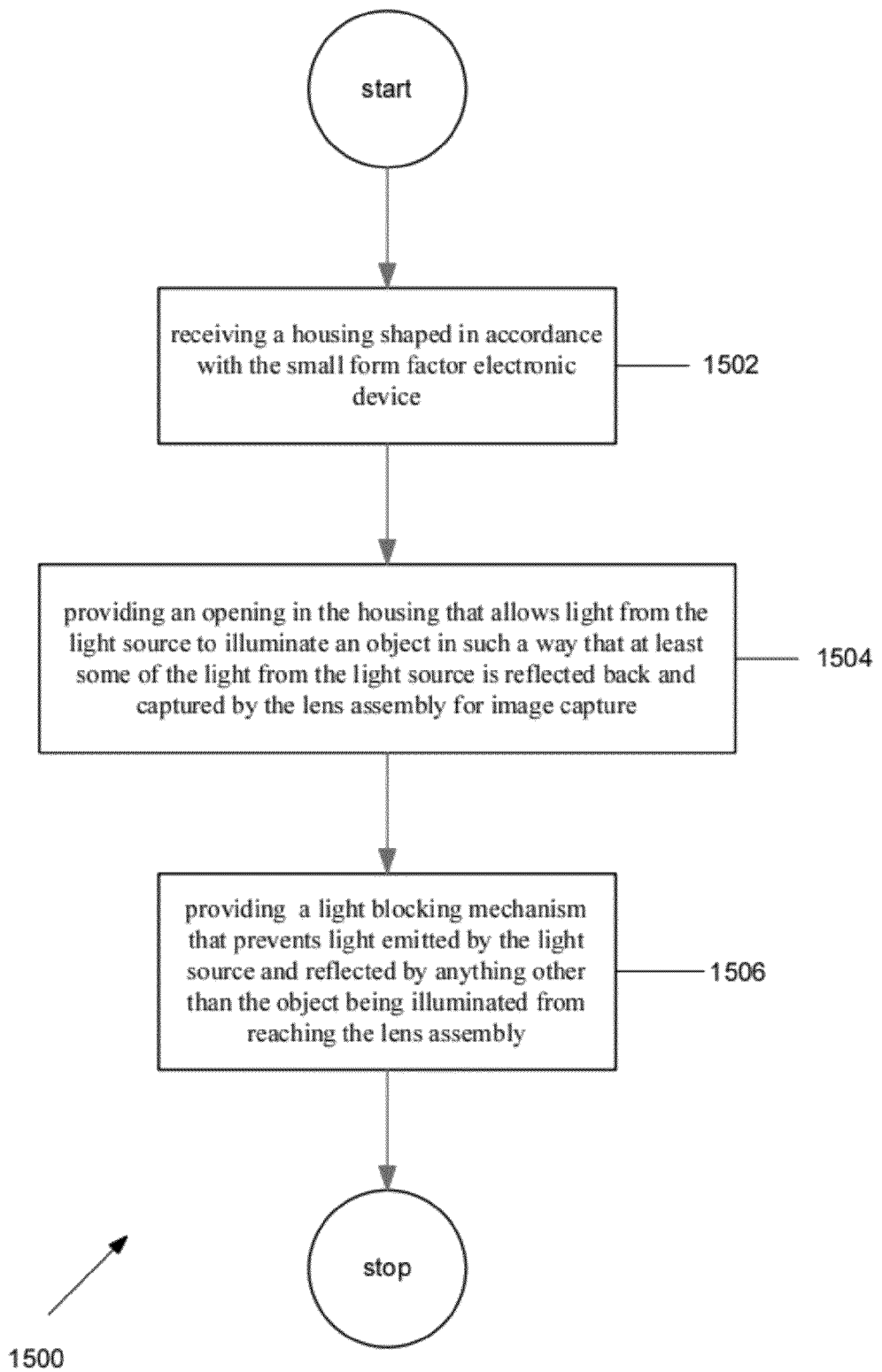
FIG. 15 shows a flowchart detailing a process in accordance with the described embodiments.

FIG. 15 shows a flowchart detailing process 1500 in accordance with the described embodiments. Process 1500 can begin at 1502 by receiving a housing shaped in accordance with the small form factor electronic device. At 1504, an opening in the housing is provided. In the described embodiment, the opening is suitably sized and positioned relative to the camera assembly such that when the protective cover is appropriately placed on the small form factor electronic device, the opening allows light from the light source to illuminate an object in such a way that at least some of the light from the light source is reflected back and captured by the lens assembly for image capture. At 1506, a light blocking mechanism that prevents light emitted by the light source and reflected by anything other than the object being illuminated from reaching the lens assembly is provided.

The various aspects, embodiments, implementations or features of the described embodiments can be used separately or in any combination. Various aspects of the described embodiments can be implemented by software, hardware or a combination of hardware and software. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A protective cover suitable for protecting a small form factor electronic device, the small form factor electronic device having at least a rear facing camera assembly, the camera assembly having a lens assembly and a light source in close proximity to the lens assembly, the light source arranged to emit light used to illuminate a subject, the lens assembly arranged to capture at least some of the light reflected from the subject wherein a portion of the light reflected from the subject is provided by the light source, the protective cover comprising:
   a housing, the housing having a shape in accordance with the small form factor electronic device, the shape being suitable for enclosing at least some of the rear portion of the small form factor electronic device, the housing comprising:
      a light source opening having a size and shape in accordance with the light source, comprising:
      a reflective surface substantially surrounding a surface of the light source through which light is transmitted, the substantial surrounding of the light source preventing light transmitted through the surface from leaking between the protective cover and the small form factor electronic device and the reflective surface arranged to reflect substantially all incident light transmitted through the surface from the light source to the subject, and
      a lens assembly opening having a size and shape in accordance with the lens assembly, the lens assembly opening comprising a light block that prevents substantially all light except from reflected light from the subject from reaching the lens assembly.

2. The protective cover as recited in claim 1, the light source opening further comprising a light block feature arranged to prevent light from leaking from the light source reaching an area between the protective cover and the small form factor electronic device.

3. The protective cover as recited in claim 1, wherein the housing is formed of plastic.

4. The protective cover as recited in claim 1, wherein the opening is rectangular in shape, and wherein the light blocking mechanism conforms with the shape of the opening and is attached to the housing at the opening in such a way to prevent light emitted by the light source and back reflected between the cover housing and the small form factor electronic device from reaching the lens assembly.

5. The protective cover as recited in claim 1, wherein the opening is curvilinear in shape, and wherein the light blocking mechanism conforms with the shape of the opening and is attached to the housing at the opening in such a way to prevent light emitted by the light source and back reflected between the cover housing and the small form factor electronic device from reaching the lens assembly.

6. The protective cover as recited in claim 1, wherein the light block includes at least a light reflecting mechanism, the light reflecting mechanism used to reflect light from the light source that would otherwise be blocked and absorbed by the light block.

7. The protective cover as recited in claim 1, wherein the light block surrounds only the lens assembly in such as was as to optically isolate the lens assembly from light emitted by the light source and back reflected in the region between the small form factor electronic device and the cover.

8. The protective cover as recited in claim 1, wherein the light block partially surrounds the lens assembly in such as was as to optically isolate the lens assembly from light emitted by the light source and back reflected in the region between the small form factor electronic device and the cover.

* * * * *